(12) United States Patent
Nugent

(10) Patent No.: US 9,204,190 B2
(45) Date of Patent: Dec. 1, 2015

(54) METHODS AND SYSTEMS FOR VERIFICATION OF VIDEO DELIVERY

(71) Applicant: VIDillion, Inc., Las Vegas, NV (US)

(72) Inventor: Dennis M. Nugent, Las Vegas, NV (US)

(73) Assignee: Vidillion, INC, Las Vegas, NV (US)

( * ) Notice: Subject to any disclaimer, the term of this patent is extended or adjusted under 35 U.S.C. 154(b) by 401 days.

(21) Appl. No.: 13/800,781

(22) Filed: Mar. 13, 2013

(65) Prior Publication Data

US 2013/0268964 A1 Oct. 10, 2013

Related U.S. Application Data

(60) Provisional application No. 61/619,292, filed on Apr. 2, 2012.

(51) Int. Cl.
| | |
|---|---|
| *H04N 7/10* | (2006.01) |
| *H04N 21/472* | (2011.01) |
| *H04N 21/24* | (2011.01) |
| *H04N 21/258* | (2011.01) |
| *H04N 21/262* | (2011.01) |
| *H04N 21/61* | (2011.01) |

(52) U.S. Cl.
CPC ......... *H04N 21/472* (2013.01); *H04N 21/2407* (2013.01); *H04N 21/25841* (2013.01); *H04N 21/26258* (2013.01); *H04N 21/6125* (2013.01)

(58) Field of Classification Search
CPC ........... H04N 21/4524; H04N 21/2405; G06F 17/3087; H04L 29/08657
See application file for complete search history.

(56) References Cited

U.S. PATENT DOCUMENTS

| | | | |
|---|---|---|---|
| 2002/0120564 A1* | 8/2002 | Strietzel .......................... | 705/40 |
| 2002/0147634 A1* | 10/2002 | Jacoby et al. .................... | 705/14 |
| 2003/0061305 A1* | 3/2003 | Copley et al. .................. | 709/217 |
| 2008/0195664 A1* | 8/2008 | Maharajh et al. .......... | 707/104.1 |

* cited by examiner

*Primary Examiner* — Nathan Flynn
*Assistant Examiner* — Alfonso Castro
(74) *Attorney, Agent, or Firm* — Joseph Stecewycz

(57) ABSTRACT

A method of delivering video content. The method may comprise receiving a request for a first video from an Internet connected device, selecting a second video to be played with the first video, generating a playlist comprising the first video and the second video, and transmitting the playlist to the Internet connected device. The playlist may include a verification video. Additionally, a system for delivering video content is described. The system may include a processor, storage, an operating system, one or more network interfaces capable of communicating with a plurality of video advertising networks, a digital advanced stream redirector generator module capable of generating a playlist, and a scripting engine.

20 Claims, 8 Drawing Sheets

```
< EVENT NAME = "runclip1" WHENDONE =
    "NEXT">
    </ EVENT>
    <ENTRY>
< REF HREF= "mms://server1/ad1.wmv" />
    <ENTRY>
< EVENT NAME = "runclip2" WHENDONE =
    "NEXT">
    </ EVENT>
    <ENTRY>
< REF HREF= "mms://server4/
    verificationclipend.wmv" />
    <ENTRY>
< EVENT NAME="runclip3"
    WHENDONE="NEXT">
    </ EVENT>
    <ENTRY>
< REF HREF= "mms://server2/channelabcd" />
    <ENTRY>
    </ASX>
```

FIG. 3
*(Continued)*

METHODS AND SYSTEMS FOR VERIFICATION OF VIDEO DELIVERY

CROSS REFERENCE

This application claims the benefit of U.S. Provisional Application No. 61/619,292, filed on Apr. 2, 2012, which is incorporated herein by reference in its entirety.

BACKGROUND

The accessibility and consumption of video content over the Internet has grown exponentially in recent years. As a result, more and more users have shifted to watching or accessing video content on and through Internet-connected devices capable of reaching a variety of video content resources spread throughout the world. In connection with this shift of viewing habits to accessing Internet-based video content, video content providers have sought to help monetize and support such video delivery by incorporating video-based advertisements into and around the video content requested by users.

Video content providers would like to know whether a particular video served to a user over the Internet is actually received or watched by the user in its entirety. The ability for users to skip or fast-forward past certain videos, or certain portions of videos, means that content providers may know only whether a particular video is requested, but not whether it is actually received or watched by the user. Such uncertainty as to whether videos are actually watched by the requesting user may limit the desirability or incentive for many video content producers to make their video content accessible over the Internet. For example, advertisers may desire to include a short video advertisement around certain highly-requested videos. However, other solutions may not provide sufficient levels of certainty to the advertisers that their advertisements are actually received and watched by users. Lacking such verification, many advertisers may be hesitant to commit the costs of distributing their advertisements in connection with online video content.

As a result, there is a need to provide better information to video content providers regarding delivery of their video content, including advertising content, through Internet-connected devices.

INCORPORATION BY REFERENCE

All publications, patents, and patent applications mentioned in this specification are hereby incorporated by reference to the same extent as if each individual publication, patent, or patent application was specifically and individually indicated to be incorporated by reference.

DETAILED DESCRIPTION

Figure 1:
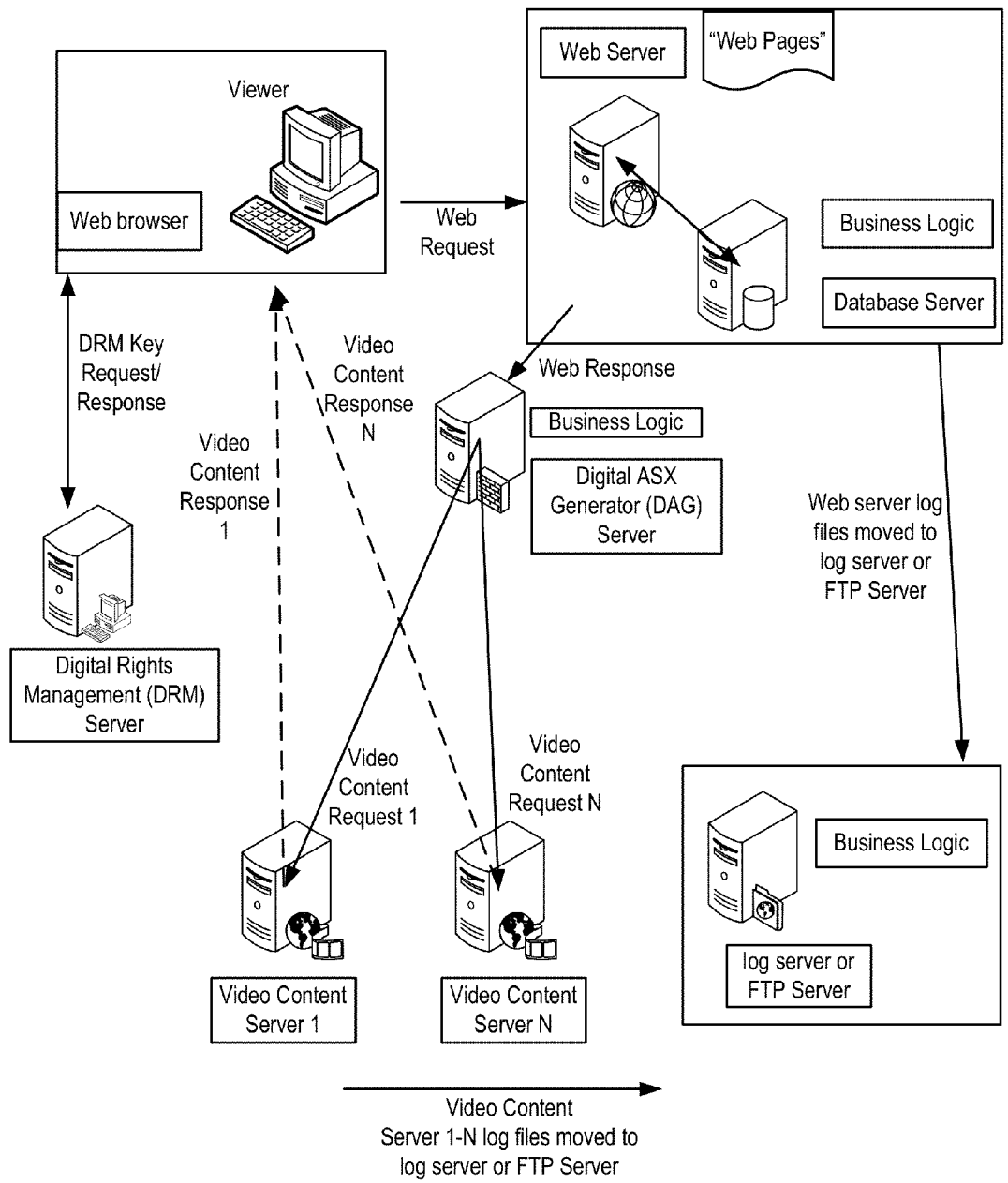
FIG. 1 is a block diagram illustrating various components of a system configured to provide verification of data delivery over the Internet according to an embodiment.

Systems and methods for verifications of video delivery to Internet-connected devices are described herein.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in various embodiments.

Content Routing

Various embodiments described herein can be implemented over a network, such as the Internet. The Internet is a network between multiple Internet Service Providers (ISPs). Companies that have content (such as content distribution networks) exchange their content with ISPs that have users attempting to see the content. The ISPs exchange content, or Internet traffic, at peering points and data centers.

One method used for routing between ISPs and content providers is Border Gateway Protocol (BGP). An ISP may route traffic to the destination Internet Protocol (IP) Address based on how the content provider is announcing the IP address on the Internet. It is possible for a content provider to have one IP address announced, and be present, in multiple physical locations.

North American and European exchange points are generally in major metro areas, such as Los Angeles, Chicago, New York, London, and Amsterdam. As an example, assume a content provider is announcing the same publicly routable IP address (e.g. 69.1.64.1) in Los Angeles, Chicago, New York, London, and Amsterdam. Also assume that an ISP peered, or exchanged traffic, in each of those locations with that content provider. The ISP users in the Western United States should be routed to Los Angeles; whereas the same ISP users in Ireland should be routed to London.

In the event of a network outage in one location, the content provider may stop announcing the route at that location, and BGP routing could route ISP users to a different location. For example, if the content provider has a network outage in Los Angeles, the ISP may route their west coast users to either Chicago or New York. It is difficult and expensive to exchange traffic, or peer, at each location that both the content provider and ISP have peering. For example, a content provider may have ten exchange points in the United States, and only peer with a European ISP in one of those locations. Thus, all of the European ISP users will be directed to that one exchange point. In some situations, it is impossible for the content provider to peer directly with the ISP. In that case, the traffic will transit through other ISPs or service providers in order to reach its destination. There are several commercially available databases that estimate a user's physical location based on its IP address. These databases are commonly used by content providers to estimate the user's physical location Content Providers and Content Servers Internet video streaming starts with content ingestion. Content can be delivered on tape, DVD, via satellite dish, etc. Content can be any audiovisual video capable of being digitally delivered to the user, including without limitation second video ads, two-hour long movies, or 24×7 linear channels. The content may then be encoded into a format compatible with the viewers' device.

Video clips and movies are stored on video content storage servers. Live feed is continuously ingested. A playlist tells the master server which files to play, and when. The master server then sends the stream to edge servers, located in various parts of the world. The viewer connects to the Internet, and is directed to the DNS server. The DNS server then directs the viewer to the authentication server, or directly to the electronic program guide (EPG) server Content providers may maintain multiple copies of the same content in multiple servers and multiple locations. These multiple locations are often referred to as points of presence (POP's).

It should be understood that the content servers may be loaded with different operating systems and may have multiple software applications installed and capable of running in connection with the operating system, for facilitating platform functionality.

The content servers may be connected to the Internet and traffic may be routed to the servers' IP Address. The content provider can have one or more servers per POP. Additionally, the content provider can segment user requests and/or responding content traffic at each POP. The server responding to the content request is not required to be at the POP where the viewer request arrived.

In one aspect of the invention, a user's device may be connected to the Internet and may be used to connect to and receive content from a content provider. Users can employ various types of devices to connect to the network and Internet. Examples of these devices include but are not limited to computers, smart phones, tablet computers, and television set top boxes. A television set top box is a device that connects to the Internet and the television's input panel.

When a user's device requests content from a content provider, a number of variables may be provided to the content provider in connection with the user's request. For example, the user's request may include one or more of the following information: User agent, Browser type, Internet Protocol (IP) address, a globally-unique identifier (GUID) that may be represented, for example, as a 32-character hexadecimal string, Unique Device (or viewer) ID, Device Operating System (Windows, Linux, etc), and acceptable languages.

The content server may automatically timestamp the user's request. After the server decides that it can and should provide the requested content to the user, it will supply the content, and optionally update one or more database tables documenting the transaction event.

FIG. 1 is a block diagram illustrating various components of a system configured to provide verification of data delivery over the Internet, according to one embodiment. In one embodiment, the Viewer sends a request over the Internet to the Web Server for video content. The video content can be both live streaming, as well as video on demand (movies, video clips, etc). The Web Server may forward that request to the Digital ASX Generator Server ("DAG Server"). The DAG Server may perform various security measures, such as authenticating the requesting device and user. The DAG Server may determine the user agent of the Viewer's device in order to determine the correct format (mime-type) to serve video clips to the Viewer's device. The DAG Server may determine which video clips are available to serve to the Viewer based on business logic and available spots. The DAG Server responds to a user request by returning an ASX file with the appropriate video content references.

The Advanced Stream Redirector (ASX) format is a type of XML metafile designed to store a list of Windows Media files to play during a multimedia presentation. It is used frequently on streaming video servers where multiple video content files are to be played in succession. A DAG Server may support a number of streaming protocols, such as RTSP, MMS, and HTTP. In some embodiments, ASX files have MIME type video/x-ms-asf. For example, an ASX file may include the following structure:

```
<ASX Version = "3.0">
    <ENTRY>
        <REF HREF = "mms://server1/welcome1.asf" />
    </ENTRY>
    <EVENT NAME="test" WHENDONE="NEXT">
    </EVENT>
    <ENTRY>
        <REF HREF = "mms://server1/sample.asf" />
    </ENTRY>
</ASX>
```

In some embodiments, DAG may also create WSX files. A WSX file is an XML file that defines the sequence of ads and media in a playlist, and provides information as to how they should behave. WSX files are used for server-side playlists. For example, WSX file may contain the following:

```
<?wsx version="1.0"?>
<smil>
    <seq id="sq1">
        <media id="video1" src="clip1.wmv" />
        <media id="video2" src="clip2.wmv" />
    </seq>
</smil>
```

DAG Server

As illustrated in FIG. 1, a user's request for video content, in connection with an embodiment, may be routed to a DAG Server. The DAG Server, in response to a user request, generates ASX files containing a listing of one or more locations containing the requested or other video content that should be accessible to the user's device in response to the user's initial request.

DAG Server may digitally sign a publisher's media streaming requests for streams that are protected. For example, the DAG Server could sign the stream using a secure token, a password, or a hash. In some embodiments, DAG Server may bypass this security step if the media streams are protected with Digital Rights Management (DRM) access control. The media servers can then validate that each streaming request is authorized, and reject those that are not.

In some embodiments, a user requesting content may be routed to the closest DAG Server. Determination of the closest DAG Server may be accomplished using any number of methodologies, including, for example, by use of BGP routing. In some scenarios, the DAG Server may use the user's IP address to determine the country or area in which the user is located, and may then direct the user to the closest content media server based on such country or area. A variety of approaches may be used for determining a user's location relative to requested content and for directing a user's request to a server located close to the user's location.

The DAG Server may provide the functionality to direct a single viewer, a small ISP, or a metro area to a specific POP, regardless of distance. The DAG Server may provide the content operator with the opportunity for granularity in delivering traffic to the closest POP to the viewer.

In one embodiment, DAG Server may be accessed using a single global sub-domain name (dag.total-stream.net). That sub-domain name may resolve to a single IP address that is announced globally by the content provider via BGP from multiple locations. This routing approach would permit users to be routed to the "nearest" point on the net announcing the given destination IP when attempting to connect to DAG Server's single global sub-domain name.

The use of such a sub-domain name may permit certain failover capabilities in the DAG Server. If there is a network issue in one POP, the content provider discontinues announcing that IP address from that POP, while the single IP address is announced globally via BGP from the remainder of the POPs. Thus there is automatic fail-over to a different data center, if one server or one data center is in accessible.

In some embodiments, DAG Server may alternatively utilize Anycast routing methodologies. Anycast is a network addressing and routing methodology in which datagrams from a single sender are routed to the topologically nearest node in a group of potential receivers all identified by the same destination address.

In addition to the single global sub-domain name, the DAG Server in each POP may also have its own local sub-domain name and local IP address. Each data center hosting a DAG Server (POP) may also have a dc specific sub-domain name (e.g. dag-lax.totalstream.net). In this manner, the features and functionality performed by the DAG Server may be replicated in order to provide high availability clusters for reliability and scalability.

According to an embodiment, regardless of which DAG Server a request ends up in, the media URLs embedded in each ASX references the content server POP closest to the requester, based on a geo-lookup off of the requester s IP address; or to a POP specified on other criteria.

Traffic Director

One component of the DAG Server is Traffic Director. The objective of Traffic Director is to determine the location of the user, and then connect the user to the content provider's closest point of presence (POP) that has the content that the viewer requested. The DAG Server may use subdomain names to identify the location of the POP. For example, the DAG Server may use the following: Global: dag.total-stream.net; Localized: dag-poplocationcode.total-stream.net.

Poplocation Code is a three character acronym based on the nearest major airport code. The airport codes are based on the International Air Transport Association airport code. PoplocationcodeTotal-stream.net with the hyphen identifies a POP; containing groups of IPs, where the IPs may change often. The quantity of IPs per area will vary based on load. There are multiple DNS servers for dag.total-stream.net located in multiple locations. Viewers in different countries doing a trace route use different DNS servers; and may get different results. DAG may also use sub-domain names to identify the customer that owns the content. For example, the DAG may use the following: Global: customernamecode.total-stream.net; Localized: customernamecode-lax.totalstream.net.

By way of example, viewers tracing to dag-poplocationcode.total-stream.net from New York should resolve to 69.1.92.106, 69.1.92.122 IPv4 IP addresses in Ashburn; while viewers tracing to dag-poplocationcode.total-stream.net from Los Angeles should resolve to 69.1.67.74 IPv4 IP addresses in Los Angeles Total-stream.net with the hyphen resolves to IPs that are globally announced (The 69.1.70.0/24 IPv4 IP addresses network). Viewers tracing to dag.total-stream.net will go to the closest DAG Server based on BGP routing.

DAG sub-domain names can also resolve to other sub-domain names, by using CNAME records. A CNAME record or Canonical Name record is a type of resource record in the Domain Name System (DNS) that specifies that the domain name is an alias of another, canonical domain name. By doing this, the content provider can direct traffic from other sources, and/or other content providers.

In some embodiments, Traffic Director uses the country codes from ISO 3166 to assign countries to POPs, for the purpose of calculating distances to the viewer. ISO 3166 is a standard published by the International Organization for Standardization (ISO). It defines codes for the names of countries, dependent territories, special areas of geographical interest, and their principal subdivisions (e.g., provinces or states). If a country is not specifically named, it will be routed based on the continent, Traffic Director utilizes a continent-country-pop table that maps continents and countries to existing content providers POPs. As an example, Traffic Director may use the following ISO 3166 Codes in its table:

| Country | POP |
|---------|-----|
| "AD" | "customernamecode-ams.total-stream.net" |
| "AE" | "customernamecode-lax.total-stream.net" |
| "AF" | "customernamecode-lax.total-stream.net" |

In some embodiments, Traffic Director may use the average latitude and longitude for US States and Canadian Territories for the purpose of calculating distances. Large, populous states (e.g. California) are split into sections. Traffic Director may use two letter codes to represent states. A sample list is:

| State | Latitude | Longitude |
|-------|----------|-----------|
| AK | 61.3850 | −152.2683 |
| AL | 32.7990 | −86.8073 |
| AR | 34.9513 | −92.3809 |

In other embodiments, Traffic Director may also use commercially available databases to estimate the user's physical location, including based on IPv4 IP address.

Log Server

In some embodiments, as illustrated in FIG. 1, a Log Server may be utilized to collect and process log files from the video content servers, the DAG Server, or any other server utilized in the system. For example, the log files may be collected from each video content server that provides video content.

In some embodiments, the Log Server may aggregate log files from various servers in order to process and provide verification of video content delivery. In one embodiment, video content verification may be performed by determining the amount of time elapsed between requests from the same user device for specific video content. For example, the Log Server may apply business rules to the log files from one or more video content servers in order to determine the amount of time between requests for a specific start Verification Clip and a specific end Verification Clip. If the amount of time between such requests matches the length of the video content for which verification is requested, then the system may indicate that such video content has been verified as delivered to and played in full by the user's device.

In some embodiments, the Log Server may provide access to certain reporting and analysis tools in connection with providing verification of video content delivery. In one embodiment, the reporting capabilities may involve providing an application programming interface ("API") for requesting information related to specific video content. In one embodiment, the Log Server may provide a specific API and an XML-based response containing the requested information about the verifications of video content delivery. It should be understood by a practitioner in the art that any number of variations exist for formatting and providing reporting capabilities in connection with the verification of video content delivery.

Verification Clips

In some embodiments, the systems and methods described herein may be combined with the use of small data files or short content clips in order to perform verification of content delivery. In some embodiments, the small data files or short content clips may be stored on a server remote from the user's device, which server may be configured to record the timestamp of any request for such data or clip by a user's device. Accordingly, the duration of time may be calculated by comparing the timestamp of a first request for such short content clip and the timestamp of a second request for such short content clip.

In some embodiments, two short content clips may be used to verify delivery of a third video content. A user's device may request a first short content clip ("Start Verification Clip") and the server hosting the Start Verification Clip may record the timestamp of such request. A user's device may subsequently request the full video content or other desired content over the Internet. Following delivery and playback of such full video content or other desired content, a user's device may request a second short content clip ("End Verification Clip") and the server hosting the End Verification Clip may record the timestamp of such request (each of Start Verification Clip and End Verification Clip also referred to generally as a "Verification Clip"). In some embodiments, a time duration may be calculated between the timestamp recorded for the Start Verification Clip and the timestamp recorded for the End Verification Clip, and such calculated duration may used to verify whether the requested full video content was delivered and played by the user's device. In some embodiments, the timestamp may be recorded in a log file on the server. In some embodiments, the log file on the server may be transferred periodically to the Log Server.

Figure 3:
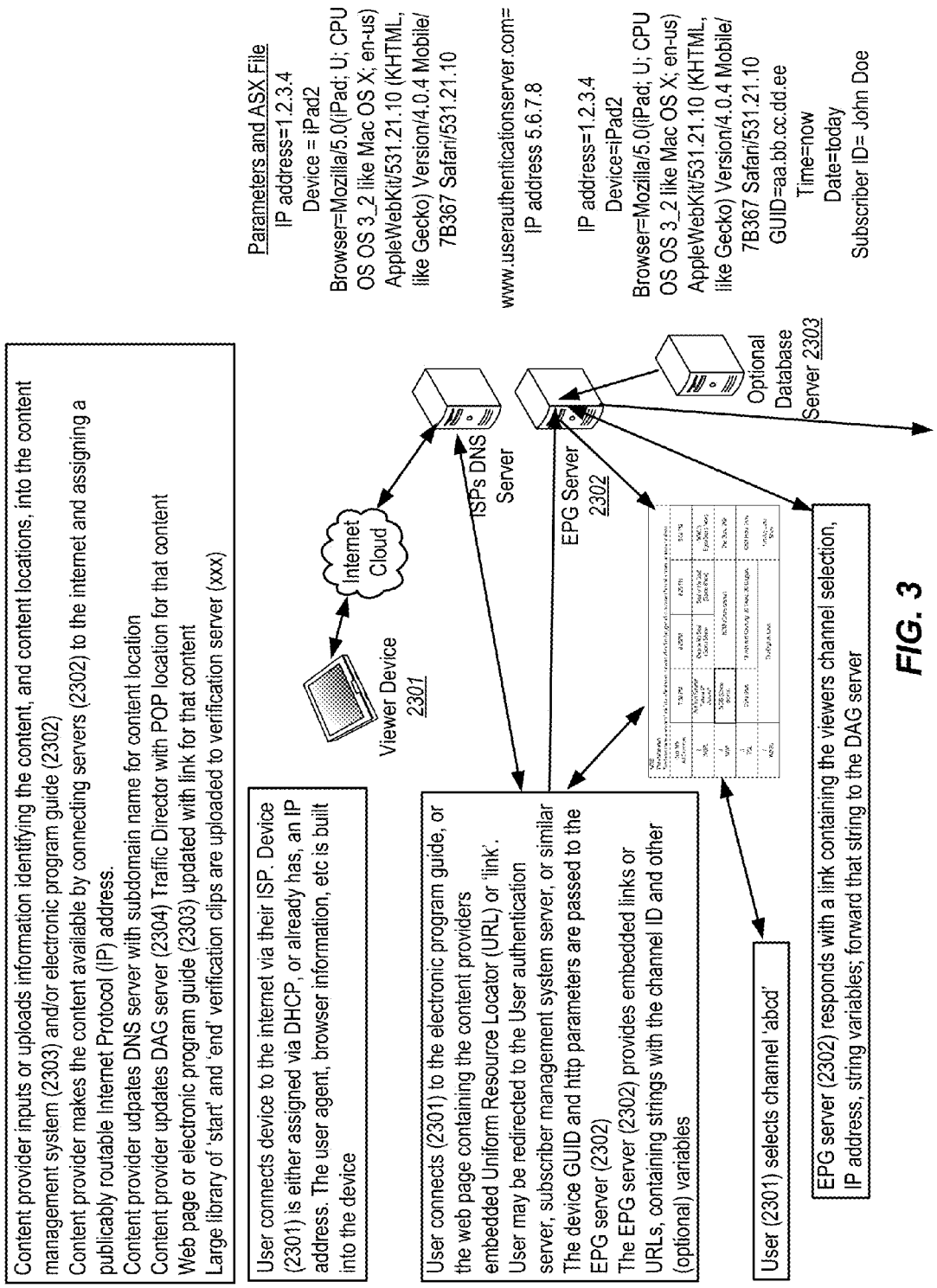
FIG. 3 is a flow chart illustrating a subset of steps usable in verifying video content delivery according to an embodiment.
Figure 3:
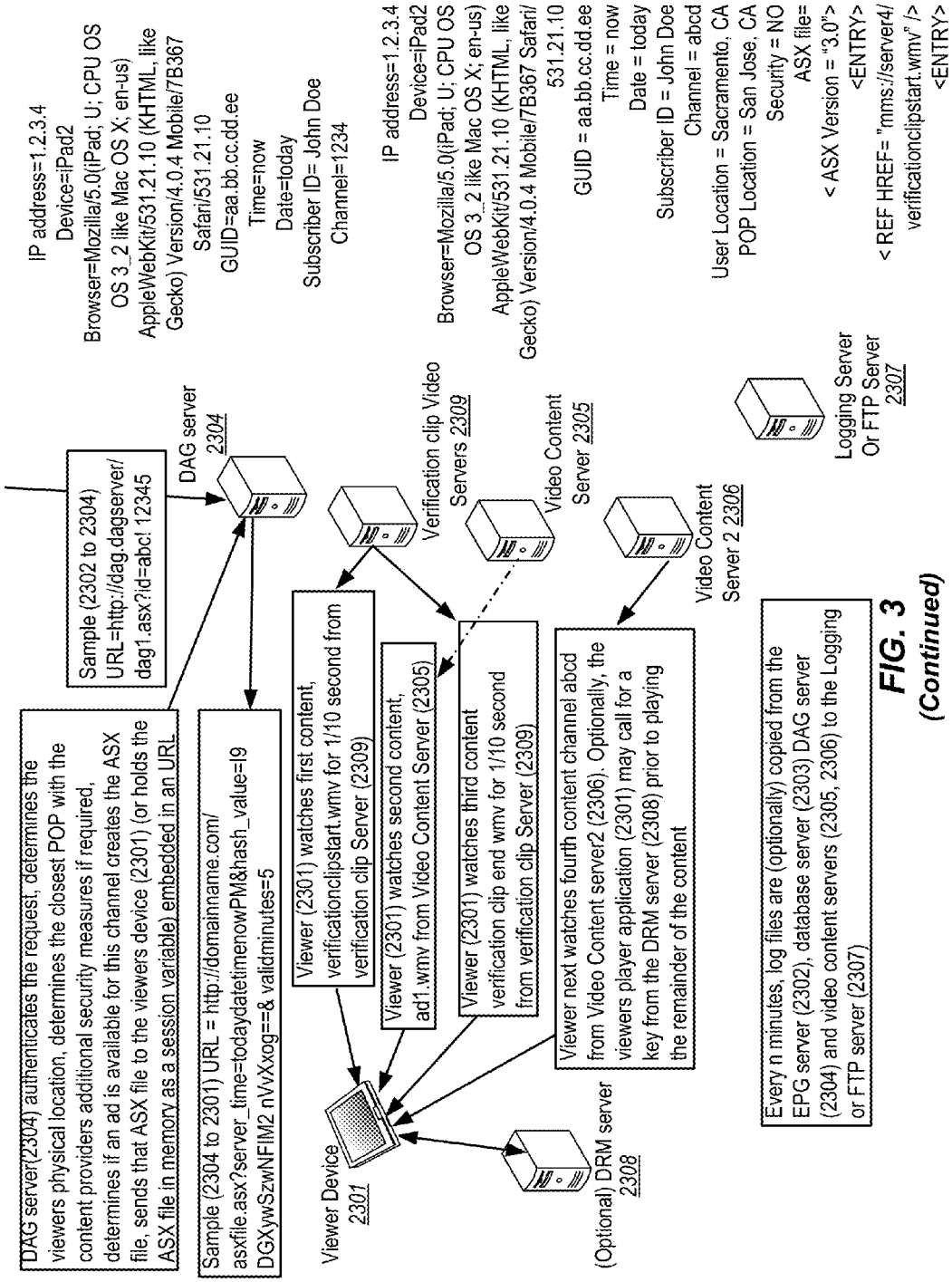

For example, as illustrated in FIG. 3, the DAG Server may include functionality to insert Start Verification Clip and an End Verification Clip for each media request for which verification of delivery is desired. A Verification Clip may be located on a content server unrelated to the video content for which verification is desired. For each video content clip that is to be verified, the DAG Server may include in the generated ASX file two additional video content references: (1) a Start Verification Clip and (2) an End Verification Clip. The Start Verification Clip is included in the ASX file to indicate that it should be played immediately prior to the video content to be verified, and the End Verification Clip is included in the ASX file to indicate that it should be played immediately after the video content to be verified. In some embodiments, the Verification Clips are located on a separate video content server from the video content server containing the user-requested video content. In some embodiments, the Verification Clips are very short video content clips, such as, for example, video content of less than 1 second in length.

In some embodiments, verification may be performed in accordance with the one or more of the following steps. Content provider inputs or uploads information identifying the content, including information as to the content's locations, into the content management system. Content provider makes the content available. Content provider updates DNS server with subdomain name for content location. Content provider updates the DAG Server's Traffic Director with POP location for that content. Web page or electronic program guide updated with link for that content. User connects device to the Internet via their ISP. Device is either assigned, or already has, an IP address. The user agent, browser information, and other user or device-specific variables are available for including as part of a user's request.

In some embodiments, verification of content delivery may include one or more of the following steps. A DAG Server receives a request for video content. DAG Server creates a playlist of video content, such as an ASX file, containing a reference to the requested video content resource and additional references to other video content. If DAG Server determines that delivery of certain video content should be verified, DAG Server may insert into the playlist a Start Verification Clip and an End Verification Clip for each such video content to be verified. The DAG Server may then transmit such generated playlist to the device of the requesting user for playback of all video content. Verification of video content delivery may occur by reviewing the log files to determine the duration of time between requests for a Start Verification Clip and an End Verification Clip and confirming that such duration relates to the length of the video content for which verification is sought.

Figure 2:
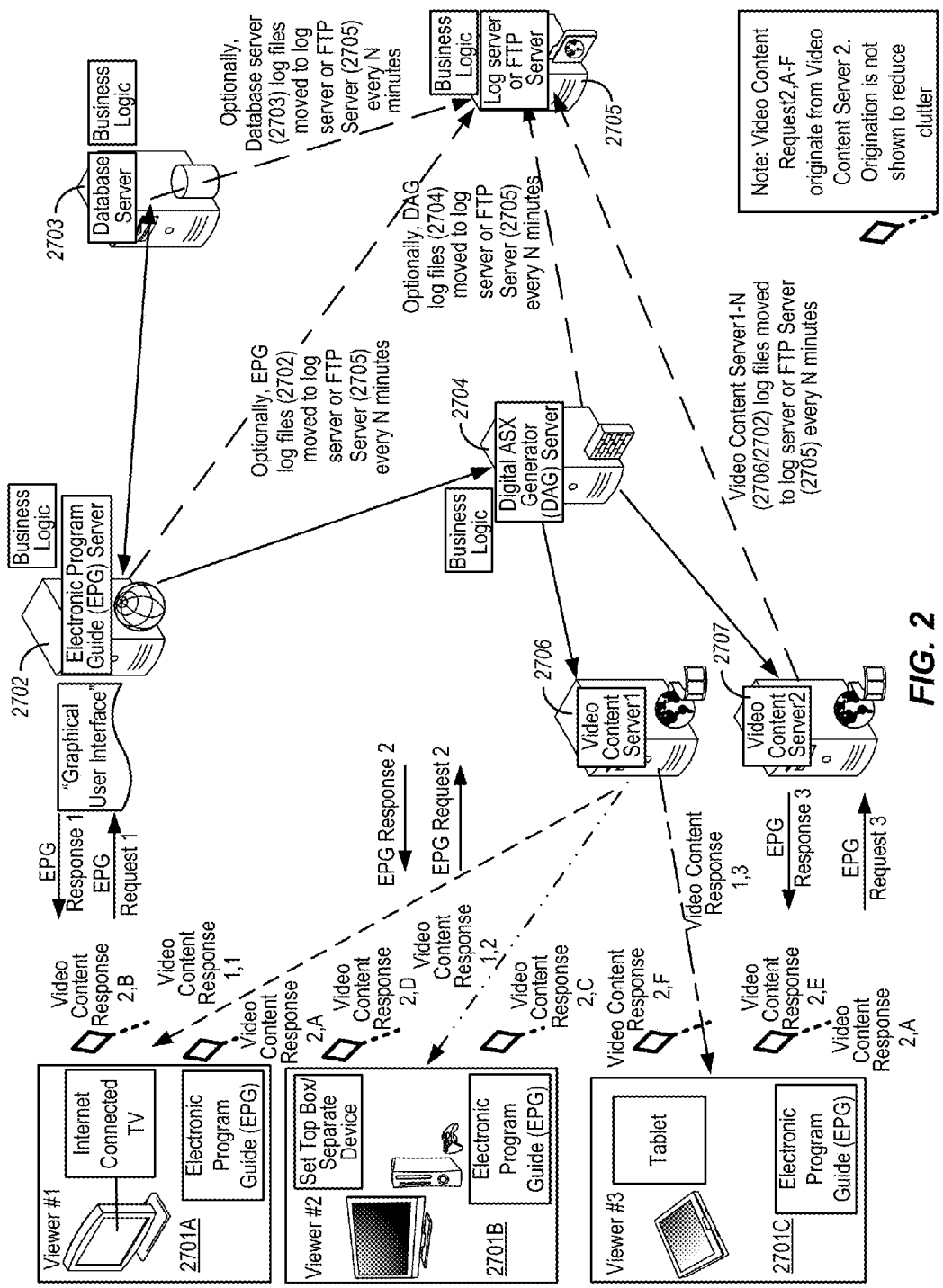
FIG. 2 is a block diagram illustrating the various components of the systems and methods described herein for use with multiple users and multiple devices according to an embodiment.

FIG. 2 is a block diagram of a network with multiple users and multiple devices according to an embodiment. The Viewers (2701-A, 2701-B, 2701-C) send a request over the Internet to the electronic program guide server (2702). The electronic program guide server (2702) may verify that the user is authenticated to connect to the system, it may verify that the user with a billing system, it may perform various security measures, and/or it may optionally store the connection information in a separate database server (2703). The electronic program guide server (2702) responds with a graphical user interface displaying available video content. The video content can be both live streaming, as well as video on demand (movies, video clips, etc).

In some embodiments, the user may request to view content in a web browser on the device. User opens browser and connects to the electronic program guide, or the web page containing the content provider's embedded link. User may be redirected to the User authentication server, subscriber management system server, or similar. The device GUID and http parameters are passed to the server. The web server provides embedded links, containing strings with the channel ID and other (optional) variables. In response to the user selecting a channel, such as channel 1234, Web server responds with a link containing the viewers channel selection, IP address, string variables and sends that to the DAG Server.

DAG Server authenticates the request, determines the viewer's physical location, determines the closest POP with the content, providers additional security measures, if required, determines if an ad is available for this channel, creates the ASX file, sends that to the viewer's device. Viewer's device processes the ASX file and presents Viewer with the content identified by the ASX file. In some embodiments, the ASX file will include advertisements for presenting to the Viewer prior to presenting the Viewer with the requested content. Events are documented in logging server.

In one embodiment, Viewer 2701-A selects the desired video content, such as by using a remote control. The electronic program guide server (2702) forwards that request to the DAG Server. The DAG Server (2704) may perform various security measures, such as authenticating the requesting device and user. The DAG Server (2704) may determine the user agent of the device in order to determine the correct format (mime-type) to serve video clips to the viewer's device. The DAG Server (2704) may determine which video clips are available to serve to the viewer based on business logic and available spots. The DAG Server (2704) responds to a user request by returning an ASX file with the appropriate video content references.

Video content may be selected by viewers using any of a variety of, such as by using a remote control or by clicking on a hyperlink. For example, Viewer 2701-B may select desired video content by using a remote control in connection with a set-top box, while Viewer 2701-C may select desired video content by clicking on a hyperlink in a web browser on a PC or a table device.

For example, in response to a request for video content by Viewer 2701-A, the DAG Server may create an ASX file that includes references to the following content in the specified order:

---
Video Content Response 2,A—a short video clip from Video Content Server 2 (2707)
Video Content Response 1,1—a video clip from Video Content Server 1 (2706)
Video Content Response 2,B—a short video clip from Video Content Server 2 (2707)

--- and return that ASX file to the device used by Viewer 2701-A. Upon receiving an ASX file response, Viewer 2701-A may send video requests to Video Content Server 2, Video Content Server 1, then Video Content Server 2, in such order, in order to request viewing of the respective content identified by the ASX file. Those video servers respond by playing video content in the correct mime-type for the requesting device. As further example, in response to a request from Viewer 2701-B, the DAG Server (2704) may create an ASX file for Viewer 2701-B containing:

---
Video Content Response 2,C—a short video clip from Video Content Server 2 (2707)
Video Content Response 1,2—a video clip from Video Content Server 1 (2706)
Video Content Response 2,C—a short video clip from Video Content Server 2 (2707)

--- and return that ASX file to the device used by Viewer 2701-B.

In some embodiments, log files from various components of the system are moved to log server or FTP Server (2705) periodically, including EPG log files (2702), Database server (2703) log files, DAG Server log files (2704), and log files from Video Content Server 1 (2706) and Video Content Server 2 (2707). After the log files are moved to the log server or FTP server (2705), business rules are applied to process the log files. Data may be transmitted to other servers.

FIG. 3 illustrates a subset of the steps taken to verify content in accordance with an embodiment. User may connect a device to the Internet via the user's ISP. Device (2301) is either assigned via DHCP, or already has, an IP address. Content provider may input or upload information into the content management system (2303) and/or electronic program guide (2302) that identifies the available content and the locations where such content is available. Content provider may make the content available by connecting server (2302) to the Internet and assigning a publicly routable Internet Protocol (IP) address. Content provider may update DNS server with a sub-domain name for the content location. Content provider may update the DAG Server (2304) and Traffic Director with the POP location for the content. Web page or electronic program guide (2303) may be updated with links for the content. A library of 'start' and 'end' verification clips may be uploaded to verification server (2309). User may connect (2301) to the electronic program guide, or the web page containing the content provider's embedded Uniform Resource Locator (URL).

User may be redirected to the User authentication server, subscriber management system server, or similar. The device GUID and HTTP parameters are passed to the EPG server (2302). The EPG server (2302) provides embedded links or URLs, containing strings with the channel ID and other variables. User (2301) selects channel 'ABCD.' EPG server (2302) responds with a link containing the viewers channel selection, IP address, string variables and forwards that string to the DAG Server. DAG Server (2304) may perform one or more steps related to the request, such as one or more of the following: authenticating the request, determining the viewer's physical location, determining the closest POP with the requested content, providing additional security measures if required, determining if an ad is available for the requested channel, creating an ASX file, sending that ASX file to the viewers device (2301), and holding an ASX file in memory as a session variable embedded in an URL. For example, the DAG Server log files (2704) may be moved to the Log Server every 2 hours, while the log files from Video Content Server 1 (2706) may be moved to the Log Server every 30 minutes.

By way of example, as illustrated in FIG. 3, Viewer (2301) may request to watch channel "ABCD" by selecting such channel from an EPG. In response, Viewer (2301) may be presented first with the video "verificationclipstart.wmv" for $\frac{1}{10}$ second from verification clip Server (2309). Viewer (2301) may then be presented second content "adl.wmv" from Video Content Server 1 (2305). Viewer (2301) may then be presented video content "verificationclipend.wmv" for $\frac{1}{10}$ second from verification clip Server (2309). Finally, Viewer (2301) may be presented with the initially requested content from channel "ABCD" from Video Content Server 2 (2306). In some scenarios, the viewer's player application (2301) may call for a key from the DRM server (2308) prior to playing the remainder of the content.

Figure 4:
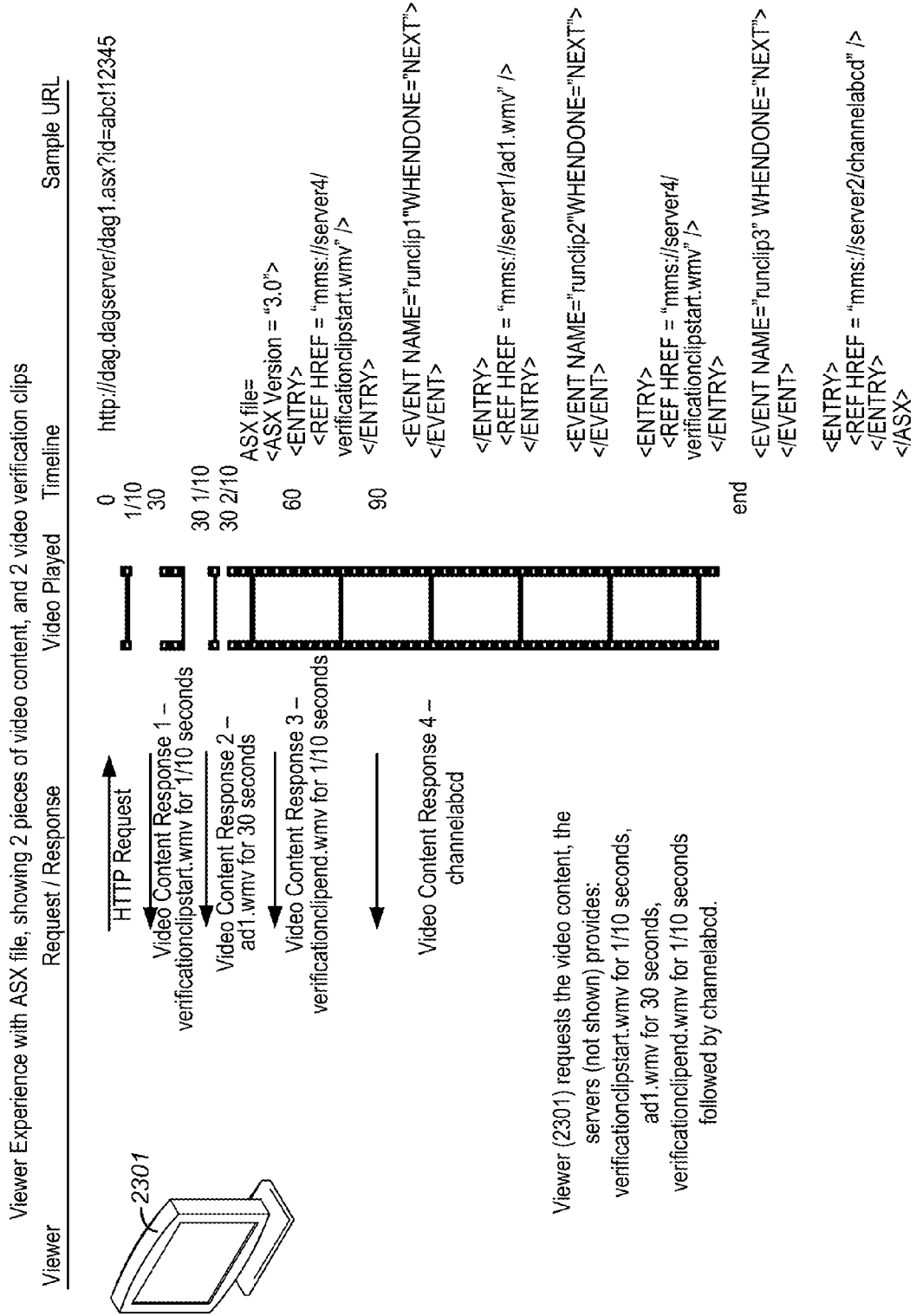
FIG. 4 is a flow chart illustrating a sample timeline of video content delivery according to an embodiment.

FIG. 4 is a flow diagram showing the steps to verify video content as illustrated in FIG. 3 along a timeline, according to an embodiment. Upon an HTTP request from Viewer 2301 to watch channel "ABCD" by selecting such channel from an EPG, the DAG Server may respond with an ASX file as illustrated in FIG. 4. In accordance with the contents of the ASX file, Viewer 2301 may be presented with a start Verification Clip named "verificationclipstart.wmv" at time 0, which video may play for $\frac{1}{10}$ of a second. Viewer 2301 may then be presented "adl.wmv" from Video Content Server 2 at time $\frac{1}{10}$, which video may play for 30 seconds. Viewer 2301 may then be presented with an end Verification Clip named "verificationclipend.wmv" at time 30 $\frac{1}{10}$, which video may play for $\frac{1}{10}$ of a second. Finally, Viewer 2301 may be presented with the initially requested content from channel "ABCD" from Video Content Server 4 at time 30 $\frac{2}{10}$, which video may play to its completion. In some embodiments, information about the Verification Clips may be recorded in a log file. In some embodiments, the log files may be transferred to the Log Server for processing and reporting purposes.

The systems and methods described herein may be used for a variety of uses and applications in which verification of content delivery is desirable. For example, the systems and methods described herein may be used to provide verification to third party advertisers who wish to distribute video advertisements in connection with other video content over the Internet. In some embodiments, a DAG Server may automatically include an advertisement with a request for other video content, and may include Start Verification Clip and End Verification Clip in a playlist transmitted to a user's device for purposes of verifying delivery of the advertisement.

Figure 5:
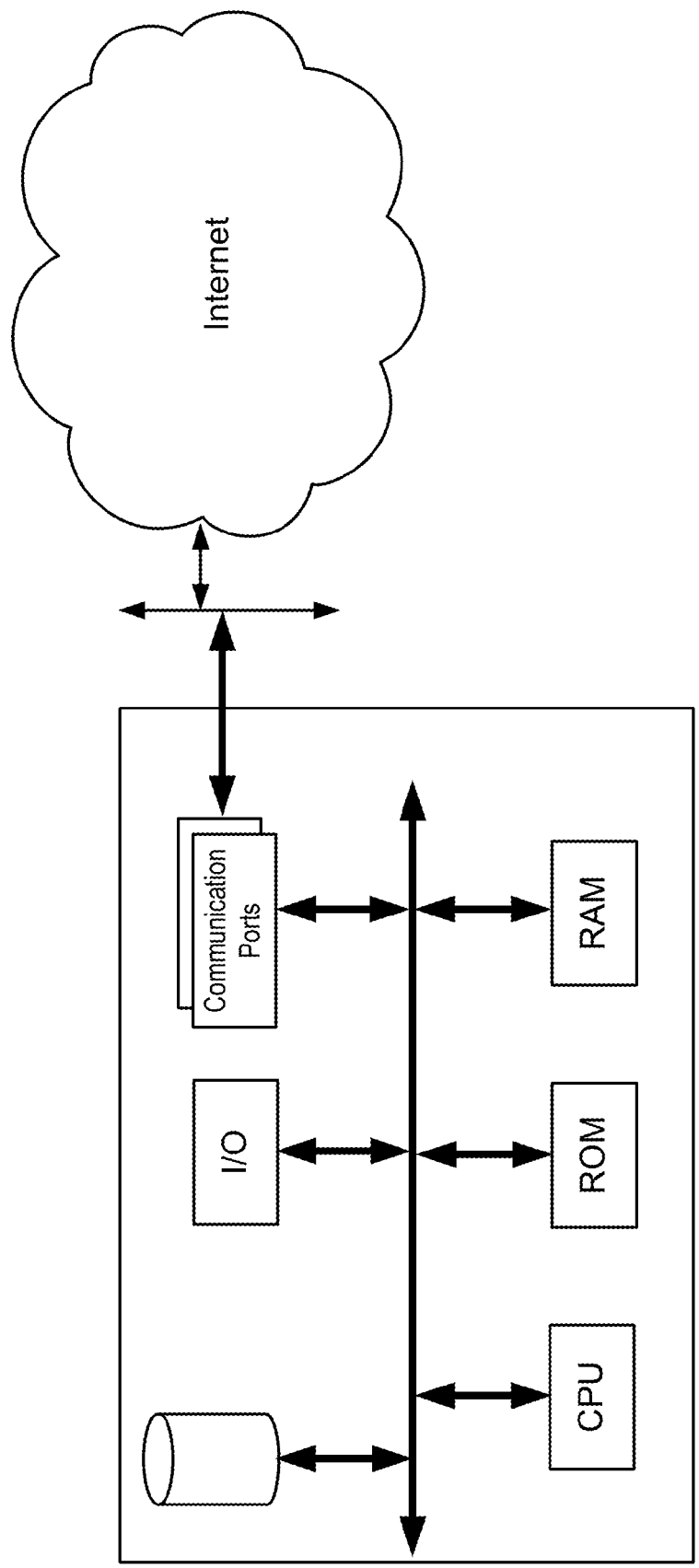
FIGS. 5 and 6 are block diagrams illustrating computer hardware and computer systems usable for implementing the systems and methods described herein.
Figure 6:
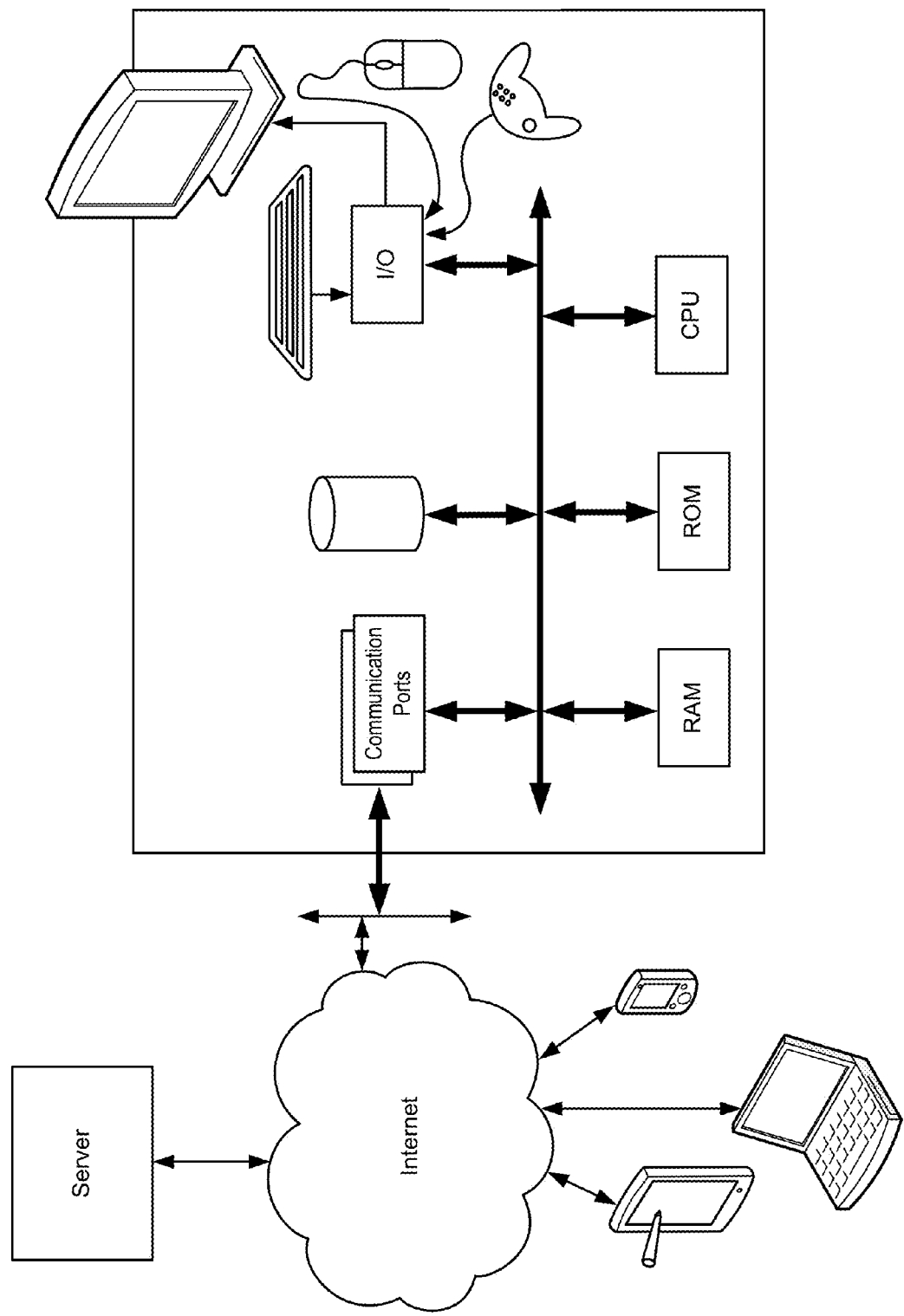

The systems and methods described herein may be implemented in or upon computer systems, such as the computer systems shown in FIGS. 5 and 6. For example, the system shown in FIG. 1 may be implemented in or upon such computer systems. Such computer systems may include various combinations of central processor or other processing device, an internal communication bus, various types of memory or storage media (RAM, ROM, EEPROM, cache memory, disk drives etc.) for code and data storage, and one or more network interface cards or ports for communication purposes. The systems and methods described herein may include or be implemented in software code, which may run on such computer systems or other systems. For example, the software code may be executable by a computer system, for example, that functions as the storage server or proxy server, and/or that functions as a user's terminal device. During operation the code may be stored within the computer system. At other times, the code may be stored at other locations and/or transmitted for loading into the appropriate computer system. Execution of the code by a processor of the computer system may enable the computer system to implement the methods and systems described herein.

FIGS. 5 and 6 provide examples of functional block diagram illustrations of computer hardware platforms, in or upon which systems and methods described herein may be implemented (for example the system of FIG. 1). FIG. 5 shows an example of a network or host computer platform, as may be used to implement a server, according to an embodiment. FIG. 6 shows a computer with user interface elements, as may be used to implement a personal computer or other type of work station or terminal device according to an embodiment, although the computer of FIG. 6 may also act as a server depending on its configuration. The computer system of FIG. 6 may communicate with other systems through a computer network. For example, computer system of FIG. 6 may communicate with the server shown or other systems or servers. The computer system of FIG. 6 may communicate with various other devices such as personal computers, tablet computers, personal digital assistants, mobile telephones and other systems. The systems and methods described herein may be implemented in or upon such computer hardware platforms in whole, in part, or in combination. For example, aspects of the systems and methods described herein involving transmission or other sharing of data between systems may be implemented on systems such as the server of FIG. 5 and the server and computer combination of FIG. 6. The systems and methods described herein, however, are not limited to use in such systems and may be implemented or used in connection with other systems, hardware or architectures. The methods described herein may be implemented in computer software that may be stored in the computer systems and servers described herein.

A computer system or server, according to various embodiments, may include a data communication interface for packet data communication. The computer system or server may also include a central processing unit (CPU), in the form of one or more processors, for executing program instructions. The computer system or server may include an internal communication bus, program storage and data storage for various data files to be processed and/or communicated by the server, although the computer system or server may receive programming and data via network communications. The computer system or server may include various hardware elements, operating systems and programming languages. The server or computing functions may be implemented in various distributed fashions, such as on a number of similar or other platforms.

The computer system may also include input and output (I/O) devices such as a mouse, game input device or controller, display, touch screen or other I/O device or devices in various combinations.

The methods described herein may be implemented in mobile devices such as mobile phones, mobile tablets and other mobile devices with various communication capabilities including wireless communications, which may include radio frequency transmission infrared transmission or other communication technology. Thus, the hardware described herein may include transmitters and receivers for radio and/or other communication technology and/or interfaces to couple to and communication with communication networks.

The methods described herein may be implemented in computer software that may be stored in the computer systems including a plurality of computer systems and servers. These may be coupled over computer networks including the Internet. Accordingly, an embodiment includes a network including the various system and devices coupled with the network.

Further, various methods and architectures as described herein, such as the various processes described herein or other processes or architectures, may be implemented in resources including computer software such as computer executable code embodied in a computer readable medium, or in electrical circuitry, or in combinations of computer software and electronic circuitry.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description herein. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any one or more of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the claims, the terms used should not be construed to limit the systems and methods to the specific embodiments disclosed in the specification and the claims, but should be construed to include all processing systems that operate under the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods.

The various features described above may be combined in various combinations. Without limitation, features described may be combined with various systems, methods and products described. Without limitation, multiple dependent claims may be made based on the description herein.

While embodiments of the invention have been shown and described herein, those skilled in the art will appreciate that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A method of delivering video content, the method comprising the steps of:
   receiving a request for a first video from a device capable of playing video;
   selecting a first video content server based on attributes of the request and the video-playing device, wherein the first video content server is capable of transmitting the first video;
   selecting a second video to be played with the first video;
   selecting a second video content server based on attributes of the second video and the video-playing device, wherein the second video content server is capable of initiating delivery of the second video;
   generating a playlist listing a reference to the first video to be requested from the first video content server and a reference to the second video to be requested from the second video content server;
   inserting into the playlist a reference to a first verification clip so as to indicate a playlist order wherein the first verification clip is requested by the video-playing device immediately prior to the second video; and
   transmitting the playlist to the video-playing device.

2. The method of claim 1, further comprising:
   inserting into the playlist a reference to a second verification clip so as to indicate a playlist order wherein the second verification clip is requested by the video-playing device immediately following the second video;
   recording logs of the sequence of videos requested from the playlist; and
   determining whether the second video has been accessed based on the logs recorded of the request for the first verification clip and the logs recorded of the request for the second verification clip.

3. The method of claim 2, wherein determining whether the second video has been accessed further comprises:
   determining whether the first verification clip and the second verification clip played on the video-playing device; and
   determining the time duration between the request for the first verification clip and the request for the second verification clip.

4. The method of claim 1, wherein the request from the video-playing device may be generated by:
   an interaction with an electronic program guide associated with a television viewing device.

5. The method of claim 1, wherein selecting the first video content server and selecting the second video content server are based on the proximity of a video content server on the Internet to the location of the video-playing device.

6. The method of claim 1, wherein the playlist comprises an ordered listing of a plurality of video content tags, wherein each video content tag identifies an item of video content and a video content server from which the video content may be requested by the video-playing device.

7. The method of claim 2, wherein the verification clip is stored on a remote server that is capable of being accessed by the video-playing device.

8. The method of claim 2, wherein the second video comprises a video advertisement and the playlist is generated so as to indicate that the second video should be played prior to the first video.

9. The method of claim 1, wherein the second video is requested from a plurality of video advertising networks based on attributes associated with one or more of the following:
   the subject matter of the first video;
   the video-playing device; and
   a user of the video-playing device.

10. A system for delivering video content, comprising:
   a processor;
   storage;
   an operating system;
   one or more network interfaces capable of communicating with a plurality of networks; and
   a digital advanced stream redirector (ASX) generator module capable of generating a playlist comprising a plurality of video content;
   a scripting engine containing logic that:
      receives a request for a first video from a video-playing device;
      selects a first video content server based on attributes of the request and the video-playing device, wherein the first video content server is capable of transmitting the first video;
      selects a second video to be played with the first video;
      selects a second video content server based on attributes of the second video and the video-playing device, wherein the second video content server is capable of transmitting the second video;
      generates a playlist containing the first video to be played from the first video content server and the second video to be played from the second video content server;
      inserts into the playlist a reference to a first verification clip so as to indicate a playlist order wherein the first verification clip is requested by the video-playing device immediately prior to the second video; and
      transmits the playlist to the video-playing device.

11. The system of claim 10, further comprising:
   inserting into the playlist a second verification video so as to indicate a playlist order wherein the second verification clip is requested by the video-playing device immediately following the second video;
   recording logs of the requested sequence of videos from the playlist; and
   determining whether the second video has been accessed based on the logs recorded of the request for the second verification clip.

12. The system of claim 10, wherein selecting the first video content server and selecting the second video content server are based on the proximity of a video content server on the Internet to the location of the video-playing device.

13. The system of claim 10, wherein the second video comprises a video advertisement and the playlist is generated so as to indicate that the second video should be played prior to the first video.

14. The system of claim 10, wherein the second video is requested from a plurality of advertising networks based on attributes associated with one or more of the following:
   the subject matter of the first video;
   the video-playing device; and
   a user of the video-playing device.

15. A system for delivering video content, comprising:
   an advertising proxy server that receives a request for a first video from a video-playing device, wherein the advertising proxy server is configured to communicate with a plurality of video content servers;
   a digital ASX generator module that generates a playlist comprising a plurality of video content based on the request for the first video from the video-playing device, the digital ASX generator module inserting into the playlist a reference to a first verification clip;
   a plurality of video content servers that transmits one or more videos for receipt by the video-playing device in response to the playlist; and
   a logging module that records attributes associated with the one or more videos comprising the playlist.

16. The system of claim 15, wherein the digital ASX generator module further inserts into the playlist a reference to a second verification clip so as to indicate a playlist order wherein the first verification clip is requested by the video-playing device immediately prior to the plurality of video content and the second verification clip is requested by the video-playing device immediately following the plurality of video content.

17. The system of claim 15, wherein the logging module further:
   collects and aggregates log data from the plurality of video content servers;
   receives a query for log data and transmits analytic results in response to the query for log data; and
   compares time durations between a first request for video content from a first video content server and a second request for video content from a second video content server.

18. The system of claim 15, wherein the plurality of video content servers that transmit one or more videos are selected based on the proximity of on the Internet each of the plurality of video content servers to the location of the video-playing device.

19. The system of claim 16, wherein the verification clip is stored on a remote server that is capable of being accessed by the video-playing device.

20. The system of claim 15, wherein the plurality of video content servers are advertising networks and provide advertisements based on attributes associated with one or more of the following:
   the subject matter of the first video;
   the video-playing device; and
   a user of the video-playing device.

* * * * *